Patented Mar. 29, 1932

1,851,888

UNITED STATES PATENT OFFICE

ERNST BERL, OF DARMSTADT, GERMANY

PROCESS FOR THE MANUFACTURE OF ACTIVATED CARBON

No Drawing. Application filed November 23, 1928, Serial No. 321,524, and in Germany November 26, 1927.

This invention relates to the manufacture of activated carbon from carbonaceous substances, for instance from substances containing cellulose and lignite, such as wood, peat or brown coal, or products of carbonization or distillation obtained therefrom, such as charcoal, peat coke, or Grude coke, etc.

It has been found that it is possible to obtain from such raw materials activated carbon of particularly high adsorbent capacity by submitting them to an activating treatment, for instance, by heating to high temperatures, in the presence of compounds which contain organically combined potassium, or substances or mixtures of substances which contain such compounds. It is possible to use as suitable additions potassium compounds of acid tars soluble in water, such as are obtained for instance in the refining of rock oil, or fossil coal tar fractions, or brown coal tar fractions. Other suitable additions are for instance potassium compounds of phenols, such as potassium phenolate, potassium naptholate, potassium-alizarin and the like, or potassium phenolates of tars obtained by low temperature carbonization of brown coal.

The process according to the invention could be carried out for instance by thoroughly mixing carbonaceous raw materials such as wood, brown coal, charcoal, peat, coke, Grude coke or the like, with the potassium-containing additions, and by heating the mixture to activation temperatures, for instance 900–1300° C. preferably 900–1100° C. The initial mixtures can be obtained for instance by mixing more or less concentrated aqueous solutions or suspensions or emulsions of the potassium compounds with the solid raw materials, drying the mixture, and activating the product of drying by heating.

According to one method of carrying out the invention the mixtures are converted, preferably when still in the warm plastic state, into suitable molded bodies which are submitted to activation. If desired, the molding can be assisted by suitable additions which have a glueing action or make them plastic. The activating beating can be carried out if desired in the presence of gases or vapors which affect or influence carbon, such as for instance air, steam, carbonic acid and the like, or of mixtures of the same.

When acid tars are treated, the special advantage is further obtained that the sulphuric acid contained in the raw material can be recovered and utilized in a very simple manner. It has been found that by simply diluting the acid tar with water, the organic substances contained in the same can be separated to such a great extent that the remaining sulphuric acid will contain in solution only relatively small quantities of organic substances, and therefore will be at once suitable for various uses. It can be used for instance for fixing ammonia, for opening up phosphates for the purpose of manufacture of superphosphates, for the manufacture of concentrated sulphuric acid, etc.

Examples of carrying out the invention will now be described.

Acid tar is diluted with water for the purpose of eliminating as far as possible the sulphuric acid contained in it, for instance by using about 1 part of water for 2 parts acid tar.

The greater part of the organic substance present will then be separated in the form of a black, pitch-like mass. This part is thereupon neutralized with suitable potassium compounds. The procedure for this purpose can be that first are added cheap neutral salts such as potassium chloride, whereupon the neutralization is completed by the addition of alkaline potassium compounds such as potassium carbonate, potassium hydroxide, or potassium sulphide. The product is brought to a suitable concentration, for instance to a pasty condition, and thoroughly mixed with the solid raw materials, preferably in the form of powder, such as sawdust, for instance in such a manner as to produce a stiff paste. The quantity of addition of the raw materials in the form of powder affects the yield and the quality of the activated carbon produced. This quantity may vary within wide limits, for instance so that 5–100 parts of solid substances are added to 100 parts of acid tar. Obviously the thickening of the acid tar treated with potassium compounds can be effected in the presence of the solid carbonaceous materials. The paste obtained is then expressed under pressure in suitable dies for the purpose of obtaining molded parts, for instance small rings. The molded parts are then dried in suitable drying apparatus and heated in the presence of gases influencing or affecting carbon, such as air, steam, carbonic acid, or mixtures of the same, or without said gases, to a temperature of 900–1100° C. until products of the best possible adsorbent capacity are obtained. Well cohering molded products are obtained which are distinguished by an extraordinary adsorption capacity. In the so-called methylene blue test, they give, for instance, a surface of 800 square meters per gram, while if sawdust is activated alone by the methods hitherto used, values of 460 square meters per gram are not exceeded.

The process can also be carried out by producing the additional substances containing organically combined potassium required for the activation in the presence of solid raw materials by mixing acid tar, preferably after previous more or less complete elimination of sulphuric acid by diluting with water, with sawdust, adding the suitable quantities of alkali compounds, for instance, first potassium chloride and then an alkaline potassium compound, and subjecting the product to further treatment as described above.

Instead of using solutions of potassium compounds of acid tar, phenols or the like, it is also possible to use acid tars or the potassium compounds prepared from them, with an addition of small quantities of liquids such as water or the like. Special importance must be attached here to the thorough mixing of the various components.

The potassium compounds can be replaced partly in certain cases by sodium compounds. The neutralization of the acid tar can be carried out therefore partly with potassium, and partly with sodium compounds, if desired with the use of cheap mixed products of potassium and sodium salts frequently occurring in industry. Mixtures of potassium and sodium phenolates can also be used for carrying out the process.

The process makes it possible to obtain from cheap carbonaceous substances such as wood, charcoal, peat, coke, etc., and with the assistance of exceedingly cheap additions, such as acid tars or tars obtained by low temperature carbonization of brown coal, or of products obtained therefrom and containing potassium in organic binding, activated carbon, if desired in the form of molded bodies, which is distinguished by strikingly high adsorption capacity.

Claims:

1. A process for the manufacture of activated carbon, which consists in admixing solid carbonaceous material with substances containing organic potassium compounds, and heating said mixture, to temperatures of from 900° C. to 1300° C.

2. A process as in claim 1, in which the heating is effected in the presence of oxidizing gases which influence carbon.

3. A process for the manufacture of activated carbon, which consists in mixing solid carbonaceous material with one or more potassium compounds of acid tars, and activating said mixture by heating.

4. A process for the manufacture of activated carbon as claimed in claim 3, in which the potassium compounds of acid tars used are prepared for use in the process by diluting the acid tars with water, and then neutralizing the separated, undissolved material resulting with potassium compounds.

5. A process for the manufacture of activated carbon as claimed in claim 3, in which the potassium compounds of acid tars used in the process are prepared for use by diluting the acid tars with water, and partly neutralizing the separated, undissolved material with one or more neutral alkali salts, then effecting complete neutralization by adding alkaline alkali salts.

6. A process for the manufacture of activated carbon, which consists in mixing solid carbonaceous material with one or more organic potassium compounds and a liquid, molding said mixture into bodies of predetermined shape, and activating said molded bodies by heating.

7. A process for the manufacture of activated carbon, which consists in mixing one or more substances from the group comprising wood, coal, and derivatives of wood and coal, with one or more substances from the group comprising potassium compounds of acid tars and potassium compounds of phenols, and heating the resultant mixture to temperatures between 900° C. and 1300° C.

8. A process as in claim 7, in which the heating is carried out in the presence of one or more gases from the group comprising air, steam, and carbon dioxide.

ERNST BERL.